United States Patent [19]

Suketomo et al.

[11] Patent Number: 4,580,801
[45] Date of Patent: Apr. 8, 1986

[54] DEVICE FOR MOUNTING AN AXLE OF A REARWARDLY CONNECTED VEHICLE IN TWIN-ENGINE TYPE MOTOR SCRAPER

[75] Inventors: Toshitaka Suketomo, Kawasaki; Kimio Miyake, Yokohama; Osamu Kurihara, Yokohama, all of Japan

[73] Assignee: Kabushiki Kaisha Komatsu Seisakusho, Japan

[21] Appl. No.: 582,217

[22] Filed: Feb. 21, 1984

[30] Foreign Application Priority Data

Feb. 22, 1983 [JP] Japan ................. 58-023705

[51] Int. Cl.⁴ ............................................. B60B 35/00
[52] U.S. Cl. .................................... 280/80 R; 180/75;
180/88; 180/312; 180/905
[58] Field of Search ............... 280/80 R, 80 A, 80 B;
180/56, 62, 75, 88, 312, 905, 906

[56] References Cited

U.S. PATENT DOCUMENTS 2,784,794  3/1957  Barenyl ............................ 180/62
3,061,030  10/1962 Smallenberg ..................... 180/235
3,497,025  2/1970  Rosenkrands .................... 180/56
3,563,328  2/1971  Ahola et al. ...................... 180/56
4,057,121  11/1977 Stedman .......................... 180/56

Primary Examiner—John A. Pekar
Assistant Examiner—Kenneth R. Rice
Attorney, Agent, or Firm—Armstrong, Nikaido, Marmelstein & Kubovcik

[57] ABSTRACT

A device for mounting an axle of a rearwardly connected vehicle in twin-type motor scraper has first and second support brackets fixedly secured to and projecting from both the left and right sides of a bottom portion of a rear frame of the vehicle, a third support bracket fixedly secured to and projecting from a substantially central portion of a cross-member located at a rear part of the rear frame, and mounting brackets fixedly secured to and projecting from an axle housing so as to correspond to the support brackets respectively. Each of the mounting brackets is connected to each of the support brackets by means of a pivot pin.

1 Claim, 4 Drawing Figures

DEVICE FOR MOUNTING AN AXLE OF A REARWARDLY CONNECTED VEHICLE IN TWIN-ENGINE TYPE MOTOR SCRAPER

BACKGROUND OF THE INVENTION

1. Field of the Invention

This invention relates to a twin-engine type motor scraper and more particularly to a device for mounting an axle of a rearwardly connected vehicle in the motor scraper of this type.

2. Description of the Prior Art

In one of the embodiments on mounting of an axle of a rearwardly connected vehicle in a twin-engine type motor scraper which have so far been employed, the axle is integrally welded to the rear frame of the rearwardly connected vehicle. This embodiment enables mounting of the axle to be made readily, but causes inconvenience in effecting disassembly, inspection and maintenance and repairs of the vehicle, and further the strength of the welded portion and peripheral portions thereof has posed a problem.

In another prior art embodiment, on both side walls of the rear frame of the rearwardly connected vehicle are formed, respectively, mounting flanges to which a differential gear case and an axle tube through which the axle passes are fixedly secured by means of bolts. In this embodiment, however, increased number of component parts raises the manufacturing cost, and further since the differential gear case serves also as a reinforcing member for the rear frame, it becomes necessary to take a measure so that the deformation of the differential gear case due to oscillations of the axle may not give a bad influence on the gears etc. As a matter of fact, however, it is very difficult to take such a measure properly.

SUMMARY OF THE INVENTION

The present invention has been contemplated in view of the above-mentioned circumstances in the prior art arrangement and has for its object to provide a device for mounting an axle of a rearwardly connected vehicle in a twin-engine type motor scraper which is dynamically or mechanically stable and which prevents the deformation of the rear frame from giving a bad influence on the gears.

Another object of the present invention is to provide a device for mounting an axle of a rearwardly connected vehicle in a twin-engine type motor scraper which enables the axle to be attached and detached readily and inspection, maintenance and repairs of the vehicle to be conducted readily.

A further object of the present invention is to provide a device for mounting an axle of a rearwardly connected vehicle in a twin-engine type motor scraper which comprises a simple and compact axle mounting portion resulting in a reduced manufacturing cost.

To achieve the above-mentioned objects, according to the present invention, there is provided a device for mounting an axle of a rearwardly connected vehicle in a twin-engine type motor scraper, characterized by comprising first and second support brackets fixedly secured to and projecting from both the left and right sides of a bottom portion of a rear frame of the rearwardly connected vehicle, a third support bracket fixedly secured to and projecting from a substantially central portion of a cross-member located at a rear part of the rear frame, first and second mounting brackets fixedly secured to and projecting from both the left and right sides of a lower portion of an axle housing, and a third mounting bracket fixedly secured to and projecting from the rear, central portion of the axle housing, wherein said first and second mounting brackets are connected to said first and second support brackets, respectively, and wherein said third mounting bracket is connected to said third support bracket.

Further, according to the present invention, there is provided a device for mounting an axle of a rearwardly connected vehicle in a twin-engine type motor scraper characterized in that each of said mounting brackets is connected to each of said support brackets by means of a pivot pin.

Still further, according to the present invention, there is provided a device for mounting an axle of a rearwardly connected vehicle in a twin-engine type motor scraper characterized in that said third mounting bracket is connected through a linkage to said third support bracket.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE INVENTION

Figure 1:
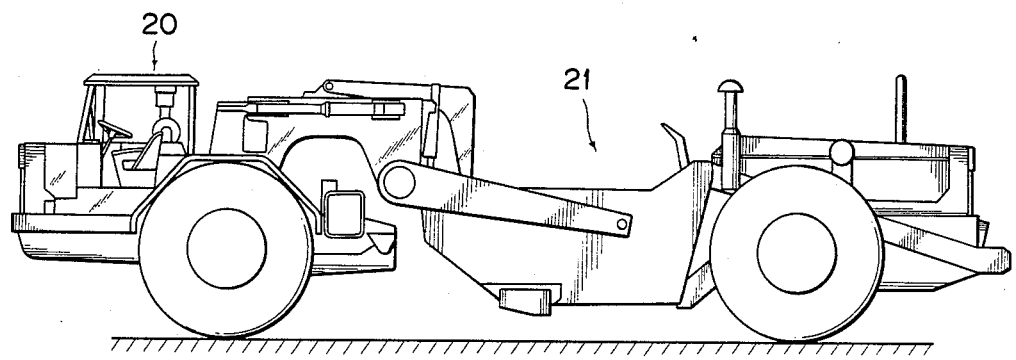
FIG. 1 is a schematic side elevational view of a motor scraper.

FIG. 1 is a schematic side elevational view of a general type motor scraper which comprises a forwardly connected vehicle 20 serving as a tractor and a rearwardly connected vehicle 21 as a trailer which has a cutter and a bowl.

In general, an engine as a prime mover for the vehicle is mounted on the tractor part, but not on the rearwardly connected vehicle. However, in large-sized motor scrapers and particularly in heavy duty motor scrapers used to scrape the ground surface under the hard condition, it is advantageous that another engine is also mounted on the rearwardly connected vehicle equipped with a cutter and a bowl.

The present invention provides a device for mounting an axle of a rearwardly connected vehicle in a twin-engine type motor scraper in which the engine is mounted on not only the tractor part, but also the rearwardly connected vehicles.

Figure 2:
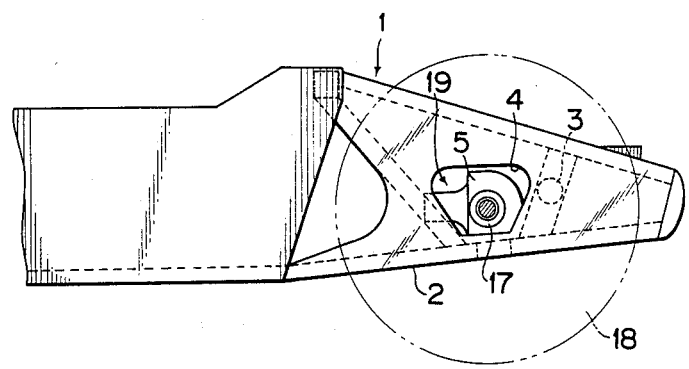
FIG. 2 is a fragmentary schematic side elevational view of a rearwardly connected vehicle of a motor scraper provided with one embodiment of an axle mounting device according to the present invention.
Figure 3:
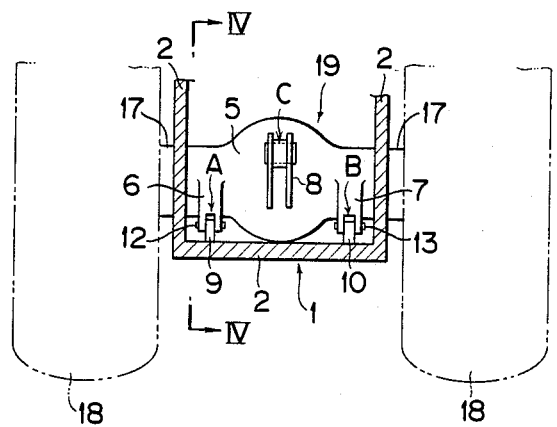
FIG. 3 is a fragmentary schematic rear view showing partially a vertical section of a rearwardly connected vehicle of a motor scraper provided with one embodiment of the axle mounting device according to the present invention.
Figure 4:
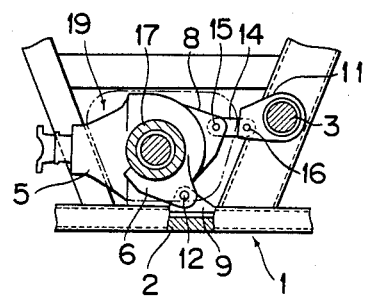
FIG. 4 is a sectional view taken along line IV—IV in FIG. 3.

The axle mounting device according to the present invention will now be described with reference to FIGS. 2 to 4.

Throughout the drawings, reference numeral 1 denotes a rear frame of a rearwardly connected vehicle of a twin-engine type motor scraper. The rear frame 1 is formed by main frames 2 on both the left and right sides and a transversely extending cross-member 3 fixedly connected between the main frames 2. Each of the main frames 2 has an aperture 4 formed therein.

Reference numeral 19 indicates an axle assembly which comprises an axle housing 5 having axle tubes 17, 17 transversely extending in left and right sides.

The axle housing 5 has left and right side mounting brackets 6 and 7 fixedly secured to and projecting from the left and right sides of the lower portion thereof. Further, the axle housing 5 has a central mounting bracket 8 fixedly secured to and projecting from the rear, central portion thereof.

The main frames 2 have support brackets 9 and 10, respectively, fixedly secured to and projecting from the bottom portions of the left and right portions thereof. The cross-member 3 has a support bracket fixedly secured to and projecting from the central portion thereof.

The left and right side mounting brackets 6 and 7 of the axle housing 5 are connected to the left and right side support brackets 9 and 10 of the main frames by means of pivot pins 12 and 13, respectively. The central mounting bracket 8 of the axle housing 5 is connected to the support bracket 11 of the cross-member 3 through a link 14 and pivot pins 15 and 16.

The left and right side axle tube portions 17 of the axle assembly 19 extend outwardly through the aforementioned apertures 4, and the left and right side transverse shafts passing through the left and right side axle tubes 17, respectively, are connected to the left and right side tires 18, 18.

As can be seen from the foregoing, the axle housing 5 of the axle assembly 19 is supported at three points thus providing dynamically or mechanically stable support.

Stating in brief, the aforesaid arrangement of the axle mounting device of the invention is made such that, even if the rear frame 1 is deformed in particular when pushed by a pusher-dozer running behind it, the deformation of the rear frame cannot be readily transmitted to the mounting portions A, B, C (FIG.3) of the axle housing 5.

It is to be understood that the foregoing description is merely illustrative of the preferred embodiment of the present invention, and that the scope of the present invention is not to be limited thereto, but is to be determined by the scope of the appended claims.

What we claim is:

1. A device for mounting the rear axle of a twin-engine type motor scraper vehicle, characterized by comprising first and second support brackets fixedly secured to and projection, respectively from the left and right sides of the bottom portion of the rear frame of said vehicle, a third support bracket fixedly secured to and projecting from a substantially central portion of a cross-member located at the rear part of the rear frame, first and second mounting brackets fixedly secured to and projecting from, respectively, the left and right sides of a lower portion of the axle housing, and a third mounting bracket fixedly secured to and projecting from the rear, central portion of the axle housing, said first and second mounting brackets being connected to said first and second support brackets, respectively, by pivot pins and said third mounting bracket being connected to said third support bracket by a link, said link being connected to said third mounting bracket and to said third support bracket, respectively, by pivot pins.

* * * * *